(12) United States Patent
Nandyalam et al.

(10) Patent No.: US 10,079,715 B1
(45) Date of Patent: Sep. 18, 2018

(54) METHODS, SYSTEMS AND COMPUTER READABLE MEDIUMS FOR PERFORMING METADATA-DRIVEN DATA COLLECTION

(71) Applicant: VCE Company, LLC, Richardson, TX (US)

(72) Inventors: Rajesh Nandyalam, Whitinsville, MA (US); Venkatesh Sudarsanam Madhipatla, Westford, MA (US); Bayi Peng, Plano, TX (US); Xiaohong Fu, Plano, TX (US); Geoffrey David Bourne, Allen, TX (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 248 days.

(21) Appl. No.: 14/801,485

(22) Filed: Jul. 16, 2015

(51) Int. Cl.
*G06F 15/177* (2006.01)
*H04L 12/24* (2006.01)
*H04L 29/08* (2006.01)
*H04L 12/26* (2006.01)

(52) U.S. Cl.
CPC .......... *H04L 41/0803* (2013.01); *H04L 43/04* (2013.01); *H04L 67/10* (2013.01)

(58) Field of Classification Search
CPC ......... H04L 67/10; H04L 43/04; H04L 41/22; H04L 43/08; H04L 67/2842; H04L 41/0803; G06K 9/00288
USPC ....................................................... 709/220
See application file for complete search history.

(56) References Cited

U.S. PATENT DOCUMENTS

| | | | | |
|---|---|---|---|---|
| 7,730,068 B2 * | 6/2010 | Sarnowicz | .......... | G06F 11/3409 707/738 |
| 8,738,972 B1 * | 5/2014 | Bakman | .............. | G06F 11/0712 714/47.1 |
| 2002/0143913 A1 * | 10/2002 | Sahita | ................. | H04L 41/0213 709/223 |
| 2005/0021723 A1 * | 1/2005 | Saperia | ................. | H04L 41/022 709/223 |
| 2008/0313207 A1 * | 12/2008 | Modad | .............. | G06F 17/30525 |
| 2009/0217162 A1 * | 8/2009 | Schneider | ........... | H04L 41/0213 715/700 |
| 2009/0276317 A1 * | 11/2009 | Dixon | .................. | G06Q 10/087 705/14.61 |
| 2010/0179940 A1 * | 7/2010 | Gilder | ............... | G06F 17/30566 707/622 |
| 2011/0072138 A1 * | 3/2011 | Canturk | ............... | G06F 9/5011 709/226 |
| 2012/0290576 A1 * | 11/2012 | Amorim | ............... | G06F 21/577 707/737 |

(Continued)

*Primary Examiner* — Imad Hussain
(74) *Attorney, Agent, or Firm* — Jenkins, Wilson, Taylor & Hunt, P.A.

(57) ABSTRACT

Methods, systems, and computer readable mediums for performing metadata-driven data collection are disclosed. According to one embodiment, a method for performing metadata-driven data collection includes receiving a request for system related data, wherein the request includes metadata indicating a protocol and identifying information for obtaining the system related data. The method also includes configuring, using the metadata, at least one data collector for obtaining the system related data. The method further includes obtaining, by the at least one data collector, the system related data and storing the system related data in a memory.

20 Claims, 4 Drawing Sheets

(56) References Cited

U.S. PATENT DOCUMENTS

| | | | | |
|---|---|---|---|---|
| 2013/0318536 A1* | 11/2013 | Fletcher | ................ | G06F 9/5011 718/104 |
| 2013/0339503 A1* | 12/2013 | Annamalaisami | .... | H04L 41/042 709/223 |
| 2014/0181296 A1* | 6/2014 | Lee | ......................... | H04L 41/28 709/224 |
| 2014/0344328 A1* | 11/2014 | Chakra et al. | ...... | H04L 67/2842 709/203 |
| 2015/0317169 A1* | 11/2015 | Sinha | ................... | H04L 49/254 713/2 |
| 2016/0092537 A1* | 3/2016 | Vieira | ............... | G06F 17/30575 707/634 |
| 2016/0094657 A1* | 3/2016 | Vieira | ................ | H04L 67/1095 709/217 |
| 2016/0239326 A1* | 8/2016 | Kaplan | ................. | G06F 9/4881 |
| 2016/0266920 A1* | 9/2016 | Atanasov | ............ | G06F 9/45558 |

* cited by examiner

| PROTOCOL | NAMESPACE | ELEMENT TYPE | FIELD NAME | MANDATORY |
| --- | --- | --- | --- | --- |
| SMI | CONFIG | ARRAY | ELEMENTNAME | TRUE |
| SMI | CONFIG | DISK | DISKTYPE | TRUE |
| SNMP | CONFIG | PORT | CATEGORY | FALSE |
| SNMP | METRIC | CPU | CPUUTILPERCENTAGE | FALSE |
| VM REST API | METRIC | DISK | DISKPERFORMANCE | FALSE |
| VM API | CONFIG | VM | GUEST.IPADDRESS | FALSE |
| VM API | METRIC | VM | VMPROCESSINGPERCENTAGE | FALSE |

METHODS, SYSTEMS AND COMPUTER READABLE MEDIUMS FOR PERFORMING METADATA-DRIVEN DATA COLLECTION

TECHNICAL FIELD

The subject matter described herein relates to data collection. More specifically, the subject matter relates to methods, systems, and computer readable mediums for performing metadata-driven data collection.

BACKGROUND

Management software can include user interfaces (UIs) and/or graphical user interfaces (GUIs) for managing, monitoring, viewing, and/or configuring one or more components (e.g., physical resources and/or virtual resources) within or associated with a computing system, e.g., a backend computing system separate from the management software. Such management software can include data collection functionality for obtaining and providing information about specific elements or entities in the computing system. For example, management software may use hard-coded software (e.g., drivers) to gather configuration information and/or other data about a component, e.g., a storage disk or processor, in a computing system. However, since data collection functionality in management software is generally hard-coded for each managed component, such data collection mechanisms are generally inefficient, cumbersome, and/or error-prone.

SUMMARY

Methods, systems, and computer readable mediums for performing metadata-driven data collection are disclosed. According to one embodiment, a method for performing metadata-driven data collection includes receiving a request for system related data, wherein the request includes metadata indicating a protocol and identifying information for obtaining the system related data. The method also includes configuring, using the metadata, at least one data collector for obtaining the system related data. The method further includes obtaining, by the at least one data collector, the system related data and storing the system related data in a memory.

BRIEF DESCRIPTION OF THE DRAWINGS

The subject matter described herein will now be explained with reference to the accompanying drawings of which:

FIG. 2 is a diagram illustrating various metadata according to an embodiment of the subject matter described herein;

DETAILED DESCRIPTION

Figure 1:
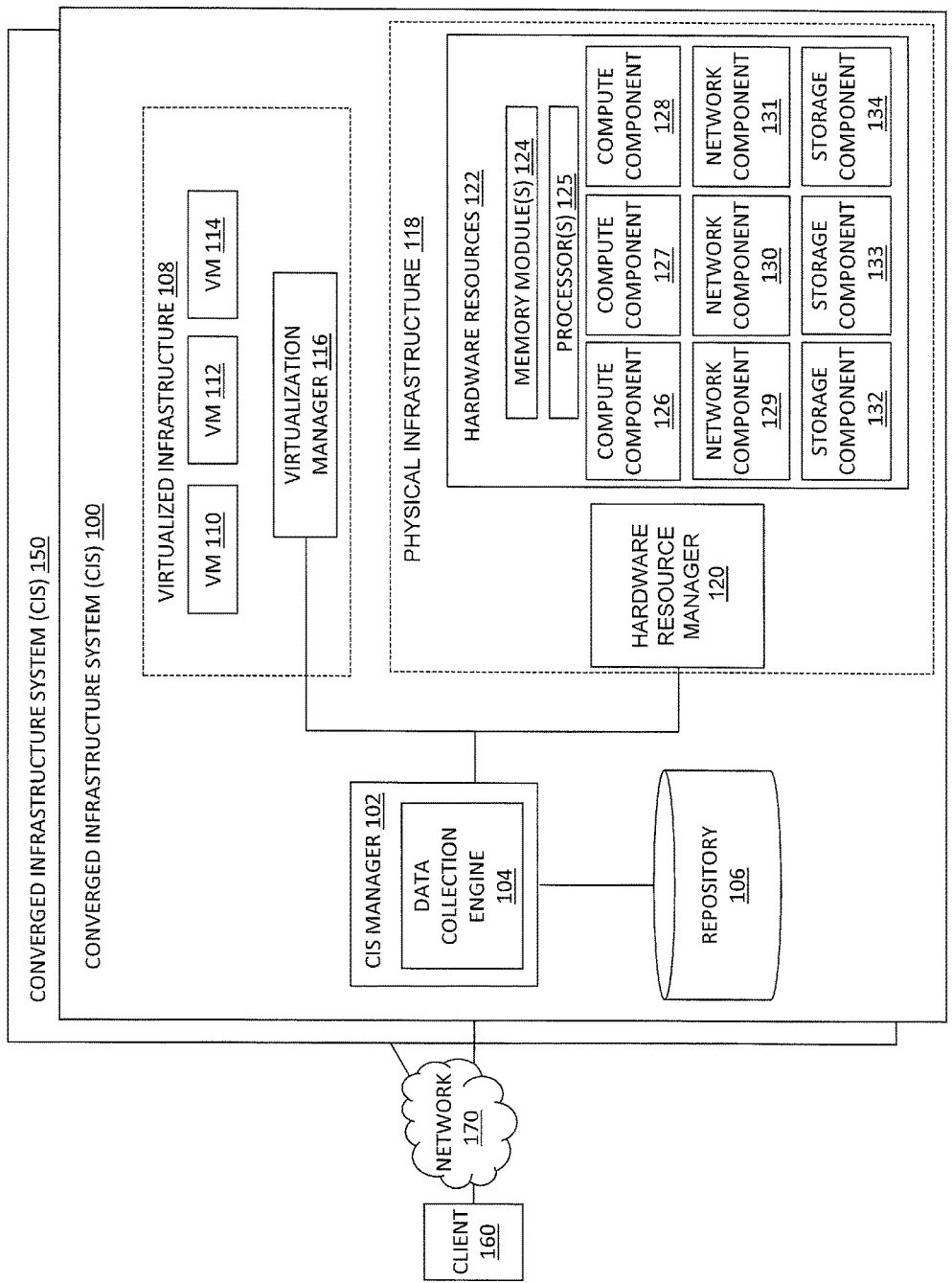
FIG. 1 is a diagram illustrating two converged infrastructure systems according to an embodiment of the subject matter described herein.

The subject matter described herein relates to methods, systems, and computer readable mediums for performing metadata-driven data collection. Software companies providing data management applications usually handle data collection by writing software agents and/or drivers for each component being managed. Each software agent and/or driver is designed to communicate with an application programming interface (API) associated with the component, to collect data about the component, and to store the collected data in a database. Usually the software agent and/or driver, including the type of data to be collected and how to collect the data, are hard-coded. Hence, to support any new data or metric for a component, a corresponding software agent and/or driver will generally require software updates and/or code changes.

Various issues arise because of hard-coded data collection techniques. For example, customization for such data collectors is generally limited and/or expensive since many data management applications provide few options for a customer to pick and choose the attributes or data needed. Further, even if customization is requested by customers, the software vendor generally creates customer specific code (e.g., custom versions of their software for each customer).

Another issue with hard-coded data collection techniques is that collected data is generally stored internally to a collection database with no options to provide the raw collected data to the customer in requested formats. Yet another issue with hard-coded data collection techniques involves the inefficiency associated with creating different software agents and/or drivers for different components even if all the components support the same data collection protocol. For example, a compute server and a switch in a cloud-based computing system may expose their data through simple network management protocol (SNMP), but a software vendor will generally use a software agent for collecting data from the compute server and a different software agent for collecting data from the switch. Yet another issue with hard-coded data collection techniques involves representing dynamic (e.g., changing) relationships between components for correlation and/or reporting purposes. Hence, because of the various issues associated with hard-coded data collection techniques, such techniques are generally inefficient and cumbersome to maintain and, further, generally lack scalability.

In accordance with some aspects of the disclosed subject matter, functionality for performing metadata-driven data collection can involve interacting with one or more converged infrastructure systems (CISs), such as an integrated infrastructure system (e.g., a Vblock® System from VCE Company, LLC), and/or computing system components (CSCs) therein. For example, a CIS can comprise multiple CSCs, such as physical resources and/or virtual resources, in a preconfigured or prepackaged computing platform, where some CSCs are developed and/or manufactured by multiple entities. For example, an exemplary CIS can comprise data storage devices, compute components, networking equipment, and software for managing physical resources and/or virtualized resources (e.g., virtual servers). Although the following disclosure describes the use of one or more CISs, any integrated infrastructure system or device can be utilized without departing from the scope of the present subject matter.

In accordance with some aspects of the disclosed subject matter, a computing platform (e.g., a node or device) or module (e.g., firmware, hardware, and/or software stored in memory and/or executing on a processor) can include functionality for performing metadata-driven data collection. For example, a data management application or other entity can provide metadata for configuring a data collector to obtain particular data about a particular CSC. In this example, the metadata can indicate to the data collector and related entities what data to collect, how often data collection is to occur, where collected data should be stored or sent, how collected data is to be formatted or provided, and/or how to correlate and/or analyze sets of collected data.

In accordance with some aspects of the disclosed subject matter, a computing platform (e.g., a node or device) or module (e.g., firmware, hardware, and/or software stored in memory and/or executing on a processor) can include functionality for collecting various aspects of information for a particular entity using different protocols. For example, using a metadata-driven data collection mechanism, a data management application may provide metadata to the metadata-driven data collection mechanism for gathering information about a virtual machine (VM). In this example, VM configuration information can be collected using a VMWare VSphere API, but information about software executing in the VM cannot be collected using the VMWare VSphere API. Continuing with this example, assume a storage related application is executing in a guest operating system (OS) in the VM, one attribute that may be requested for collection is the version number of the storage related application. Instead of requiring a user to login to the VM using secure shell (SSH) and then access the version number associated with the storage related application, the metadata-driven data collection mechanism may use the metadata received by the data management application to invoke two collectors, an SSH collector and a VMWare VSphere API collector. The SSH collector may obtain the version number using SSH and the VMWare VSphere API collector may obtain VM configuration information, such as memory capacity, storage capacity, a hostname, an Internet protocol (IP) address, etc. using a VMWare VSphere API.

In accordance with some aspects of the disclosed subject matter, a computing platform (e.g., a node or device) or module (e.g., firmware, hardware, and/or software stored in memory and/or executing on a processor) can include functionality for combining and/or formatting various aspects of collected information for a particular entity. For example, using a metadata-driven data collection mechanism, a data management application may provide metadata to the metadata-driven data collection mechanism for indicating how collected information is to be combined, formatted and/or provided to a requesting entity. In this example, the metadata-driven data collection mechanism may collect different types of VM data using different collectors, e.g., an SSH collector and a VMWare VSphere API collector. Continuing with this example, the metadata-driven data collection mechanism may use the received metadata for combining the different types of VM data into a particular report and may send the report to the data management application for displaying to a user.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating a CIS 100 and a CIS 150 according to an embodiment of the subject matter described herein. Although the following disclosure describes the use of CISs 100 and 150, any type of computer system can be utilized without departing from the scope of the present subject matter. Each of CISs 100 and 150 can comprise CSCs, such as virtual resources and physical resources. Exemplary physical resources can comprise a processor, a memory module, a compute component, a network component, a storage component, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CISs), a virtual machine, a virtual server, a virtual storage device, a virtual port, and/or a virtual communications interface. CIS 100 can also comprise software and related components for managing the CIS and/or portions (e.g., CSCs) therein.

In some embodiments, each of CISs 100 and 150 can be configured to provide data management functionality, cloud service functionality, and/or other functionality. Each of CISs 100 and CIS 150 can be capable of communicating with other CISs (e.g., located at various physical locations or sites) and can communicate with various other entities, such as network nodes (e.g., servers hosting online sites) and users. For example, client 160 can represent any entity (e.g., software executing on a processor, a web-based interface, etc.) for allowing a user (e.g., a human operator or an automated system) to interact with CISs 100 and/or 150, CSCs therein, and/or other entities. In some embodiments, client 160 can communicate directly with CISs 100 and/or 150 with or without using network 170.

In some embodiments, CIS 100 can comprise a CIS manager 102, a repository 106, virtualized infrastructure 108, and/or physical infrastructure 118. CIS manager 102 can be any suitable entity for managing aspects of CIS 100 or portions therein (e.g., CSCs or groups of CSCs). CIS manager 102 can be configured to communicate with various CSCs and/or for managing various CSCs. For example, CIS manager 102 can be configured to access each CSC within CIS 100 and return relevant information to client 160. For example, CIS manager 102 can be configured to manage performance, resource utilization levels, and other aspects associated with virtualized infrastructure 108 and/or physical infrastructure 118. In some embodiments, CIS manager 102 can comprise VCE Vision™ Intelligent Operations software and/or firmware.

In some embodiments, CIS manager 102 can include a converged infrastructure management application for interacting with CISs 100 and/or 150 and/or CSCs therein. In such embodiments, the converged infrastructure management application can include or provide a graphical user interface (GUI), a command-line interface (CLI), an application programming interface (API), and/or or other communications interface. For example, a converged infrastructure management application can provide a web-based GUI usable for performing metadata-driven data collection and/or for displaying information associated with data collection.

In some embodiments, CIS manager 102 can interact with one or more management applications (e.g., a third-party application at client 160). For example, a network management system (NMS) executing at client 160 may send data collection requests to CIS manager 102 for collecting information about various CSCs in CIS 100. In this example, CIS manager 102 may initiate data collection based on metadata provided in the data collection requests. Continuing with this example, after data is collected, CIS manager 102 or another entity may provide the collected data to the NMS or another entity (e.g., as indicated by the metadata in the data collection requests).

CIS manager 102 can comprise or interact with a data collection engine 104. Data collection engine 104 can be any suitable entity (e.g., hardware, firmware, and/or software executing on a processor) for performing one or more aspects associated with performing metadata-driven data collection. For example, data collection engine 104 can be configured to receive a request for system related data, wherein the request includes metadata indicating a protocol and identifying information for obtaining the system related data, to obtain, by at least one data collector, the system related data, wherein the at least one data collector is configured to use the metadata for obtaining the system related data, and to store the system related data in a memory. In some embodiments, data collection engine 104 or portions thereof (e.g., code and/or software) may be stored in a memory (e.g., a non-transitory computer readable medium).

In some embodiments, data collection engine 104 can include or utilize one or more communications interfaces, e.g., a GUI, a CLI, an API, or other interface, for receiving and sending data collection related information (e.g., data collection requests, metadata, and/or data collection responses). For example, a user can request, using a representation state transfer (REST) API related message, information about a particular CIS or CSC in a data collection request. In this example, after performing data collection, data collection engine 104 can provide, using a REST API related message, a data collection response containing requested data associated with the data collection request.

In some embodiments, client 160 or other entity may provide metadata for data collection using a web-based interface, such as a web page, a file (e.g., an XML file), an API, or other interface. For example, an application (e.g., a third-party management application) may initiate data collection by providing metadata, e.g., via an API or other interface to data collection engine 104. In this example, metadata may be provided in various formats (e.g., a comma-separated values (CSV) format or an XML related format) and may include configuration information usable for configuring a data collector for data collection.

In some embodiments, data collection engine 104 can include functionality for configuring a data collector using metadata. For example, a data collector may represent any suitable entity (e.g., software executing on a processor, a software driver, a firmware driver, etc.) capable of collecting or obtaining data about one or more CSCs and/or one or more CISs. In this example, data collection engine 104 may use metadata (e.g., from client 160) for configuring one or more data collectors to obtain or collect particular information about a CSC.

In some embodiments, data collection engine 104 can include functionality for configuring and/or invoking data collection from components or CSCs from among one or more CISs or computing systems. For example, using metadata received from a data management application or user, data collection engine 104 may invoke various data collectors for collecting data from multiple CISs located in different locations. In this example, each invoked data collector may be configured to collect relevant data based on the metadata.

In some embodiments (e.g., where data collection engine 104 can initiate, support, or manage data collection from multiple computing systems), data collection 104 can include functionality for receiving, obtaining, and/or accessing component credentials and/or system credentials for accessing information from one or more computing systems. For example, in a multi-system data collection scenario involving CISs 100 and 150, data collection engine 104 may invoke data collection by passing component and/or system credentials and metadata to one or more data collectors associated with CISs 100 and 150. In this example, using the credentials and metadata, the data collectors may log into or other authenticate at CISs 100 and 150 and obtain the information indicated by the metadata. After the information is obtained, the data may be correlated based on a unique identifier associated with the CISs or CSCs therein.

In some embodiments, a data collector may be associated with one or more protocols, systems, and/or components. For example, a data collector may include functionality for obtaining data from various types of CSCs (e.g., storage disks, storage arrays, ports, processors, network switches, etc.) using a SNMP or various SNMP variants thereof. In another example, a data collector may include functionality for obtaining information about a VM using SNMP, SNI, and/or other protocols or APIs.

In some embodiments, data collection engine 104 can interact with, initiate, configure, manage, and/or support a protocol(s) specific data collector. For example, a protocol(s) specific data collector may be use a particular protocol for data collection irrespective of the CSC. In this example, an SNMP data collector may be a protocol(s) specific data collector and may be capable of collecting data about a switch or a cabinet/rack like Panduit.

In some embodiments, data collection engine 104 can interact with, initiate, configure, manage, and/or support a component(s) specific data collector. For example, a component(s) specific data collector may collect data about a CSC irrespective of the protocol(s) or API(s) used by the CSC. In this example, a VM data collector may be a component(s) specific data collector and may be capable of collecting data about a VM using multiple protocols or APIs.

In some embodiments, data collection engine 104 can interact with, initiate, configure, manage, and/or support a system(s) specific data collector. For example, a system(s) specific data collector may collect data about one or more CISs irrespective of the protocol(s) or API(s) used by the CIS. In this example, a CIS data collector may be may be a system(s) specific data collector and may be capable of collecting data about various CSCs within the CIS using multiple protocols or APIs. In another example, a system(s) specific data collector may include a scheduling and/or management service that configures and/or invokes one or more component(s) specific data collectors and/or one or more protocol(s) specific data collector for obtaining system related information about the system(s).

In some embodiments, data collection engine 104 can include functionality for collecting data about a CSC using multiple data collectors. For example, if data is to be collected related to a storage array, data collection engine 104 may use metadata to configure and/or invoke multiple data collectors for collecting different information about the storage array. In this example, the collected information from the different data collectors can be merged (e.g., correlated), formatted, and presented (e.g., to a client 160) as part of the one component.

In some embodiments, metadata can be usable for indicating data to be collected by a particular data collector. In such embodiments, the metadata can be changed periodically, aperiodically, and/or dynamically, e.g., via a REST API. For example, instead of requiring a data collector to be updated when attributes or metrics are added or changed for a given CSC, a client 160 can provide updated metadata such that the data collector or code therein is (re)configured to collect the new data. In this example, the data collector or code therein need not be updated since what the data collector collects is not defined in the code but is instead controlled or determined by the metadata.

In some embodiments, metadata can be usable for scheduling data collection or related events. In such embodiments, the metadata can change periodically, aperiodically, and/or dynamically, e.g., via a REST API. For example, metadata may indicate that certain data (e.g., associated with a particular CSC or namespace) may be collected at periodically (e.g., every hour) and may indicate that other data may be collected dynamically or aperiodically, e.g., based on network conditions, user preferences, and/or triggered by user interactions.

In some embodiments, metadata can be usable for defining or configuring data persistency and/or related management of collected data. In such embodiments, metadata may indicate whether collected data is stored, where collected data is stored, how long collected data is stored, and/or where and/or when collected data is sent elsewhere. For example, data collection engine 104 may, by default, store collected data in a data store (e.g., a data structure and/or database) in repository 106, but may send some collected data to a different destination (e.g., to client 160 as indicated by metadata).

In some embodiments, metadata can be usable for correlating and/or formatting data collected using different data collectors and/or data collected from different CSCs or CISs. For example, metadata may indicate that data from two data collectors are to be combined or correlating into a single report about a VM. In this example, data collection engine 104 may identify related collected data by inspecting the collected data and correlating data associated with the VM (e.g., as indicated by a unique identifier associated with the VM). In another example, metadata may indicate that data associated with two CSCs and/or two CISs are to be used for generating a metric or KPI. In this example, data collection engine 104 may use the metadata to identify the relevant collected data (e.g., using object identifiers associated with the two CSCs and/or two CISs) and use the relevant collected data to generate the metric or KPI. By using metadata to define relationships, correlation procedures, and/or data analysis steps, cross domain correlation (e.g., correlation of data associated with different CSCs and/or data collectors) may be performed with minimal code support in data collectors.

In some embodiments, data collection engine 104 can interact with, initiate, configure, manage, and/or support data collection for new CSCs. For example, data collection engine 104 can include functionality for supporting (e.g., adding and using) new data collectors for data collection associated a new CSC. In this example, a new data collector may be written (e.g., using Java or another programming language) and may expose a configuration API, file, or other interface for configuring the data collector using metadata.

In some embodiments, data collection engine 104 can interact with, initiate, configure, manage, and/or support data collection for new CSCs. For example, data collection engine 104 can include functionality for supporting and/or initiating data collection at a new CIS. In this example, data collection engine 104 and/or a related entity may perform various actions (e.g., authentication and/or authorization procedures) for allowing data collection engine 104 to create, configure, manage, and/or invoke data collectors for obtaining information associated with the new CIS.

In some embodiments, data collection engine 104 can include functionality for monitoring data collectors and/or related processes or threads. For example, data collection engine 104 may trigger a service for monitoring thread usage of data collectors and can support multiple instances of data collectors or related threads for scalability and/or load balancing. In this example, data collection engine 104 may trigger multiple data collectors to collect data for different components, including VMs, storage arrays, ports, processors, and/or other CSCs.

In some embodiments, data collection engine 104 can support a data collector framework, a collection manager, a scheduler, and data collectors written in a variety of programming languages. For example, data collection engine 104 may support a data collector framework and/or data collectors with configurable threads written in Java, C, and/or other programming languages. In another example, a higher level collection manager service for managing data collector framework instances may be written in Java and may support load balancing and scalability. In yet another example, a Quartz based scheduler may schedule the invoking of data collectors at configurable intervals.

In some embodiments, data collection related information can be stored in repository 106. Repository 106 can include any data storage unit (e.g., a database or a plurality of databases) that can be configured to store data collection related information, such as information for scheduling data collection, information for identifying data to collect, information for correlating related collected data, usage information for indicating where to store or send collected data, and/or other information. Although FIG. 1 depicts repository 106 as a local data storage unit residing on CIS 100, repository 106 can also be embodied as a data storage unit located at an online location (e.g., a public distributed content site), on a local proxy server in a customer's or system administrator's environment, or on a different CIS without departing from the scope of the disclosed subject matter. Further, repository 106 can be implemented using one or more computing platforms, devices, or systems.

In some embodiments, repository 106 can be provisioned with data collection related information from a second repository (e.g., from a second CIS or from an online location, such as a known, online site that can be hosted by the CIS manufacturer). For example, data collection related information can be obtained or copied from a second repository (e.g., a second CIS, an online site, online repository, or any other online location) over network 170, using secure copy (SCP) protocol, file transfer protocol (FTP), secure file transfer protocol (SFTP), hypertext transfer protocol (HTTP), or any like protocol. In some embodiments, CIS 100 and a second CIS can be located at a common site and can be communicatively connected by a wired connection. In such a configuration, repository 106 can be provisioned with data collection related information from the second CIS via the wired connection. It is understood that the provisioning of repository 106 with data collection related information using the exemplary methods described above can be conducted via any automated or automatic manner. In addition, data collection related information copied from a second repository and installed into repository 106 can utilize any form of transportable mediums, such as a compact disc (CD), flash memory, a universal serial bus (USB) device, and the like.

Virtualized infrastructure 108 can comprise a virtualization environment configured to simulate components of a computing device, such as a processor, system memory, and a storage device, for executing one or more virtual machines (VMs) (e.g., VM 110, VM 112, and VM 114). Each of VM 110, VM 112, and VM 114 can be configured to perform various functions and/or services, such as web server functions or cloud application services, and can interact with various nodes, components, and/or users.

In some embodiments, virtualized infrastructure 108 can be associated with one or more virtual entities. Each virtual entity can comprise one or more CIS or portions therein, e.g., CSCs from one or more CISs. In some embodiments, virtualization manager 116 can allow logical entities to be created, deleted, or modified using an API and/or a GUI. Virtualization manager 116 can be any suitable entity (e.g., software executing in a virtual machine) for managing aspects associated with virtualized infrastructure 108. In some embodiments, virtualization manager 116 can be configured for providing data management via one or more communications interfaces. For example, virtualization manager 116 can communicate with one or more third-party management tools using APIs.

Physical infrastructure 118 can comprise physical or hardware resources 122, such as memory module(s) 124, processor(s) 125, compute components 126-128, network components 129-131, and storage components 132-134. Hardware resources 122 can be communicatively connected to various other CSCs in CIS 100 and other entities. Hardware resources 122 can be configured for use by one or more virtual entities. In some embodiments, network components 129-131 (e.g., network switches or storage area network (SAN) switches) can be configured to enable communication between the components in CIS 100. In some embodiments, one or more file share storage (FSS) systems (not shown) can be utilized to provide file system level access to a CIS across a local area network (LAN).

Hardware resource manager 120 can be any suitable entity (e.g., software executing in a virtual machine) for managing aspects associated with physical infrastructure 118. In some embodiments, hardware resource manager 120 can be configured to provision hardware resources 122 via one or more communications interfaces. For example, hardware resource manager 120 can provision hardware resources 122 for implementing one or more virtual entities in virtualized infrastructure 108. In some embodiments, hardware resource manager 120 can comprise any management component or entity, such as a unified infrastructure manager (UIM) or a unified computing system (UCS) director entity, which is configured to provision the physical hardware of CIS 100.

In some embodiments, processor(s) 125 can include a microprocessor (e.g., a trusted platform module (TPM) using trusted execution technology (TXT)), central processing unit (CPU), or any other like hardware based processing unit. In some embodiments, some aspects of the disclosed subject matter can be stored in memory module(s) 124, which can include random access memory (RAM), read only memory (ROM), optical read/write memory, cache memory, magnetic read/write memory, flash memory, or any other non-transitory computer readable medium. In some embodiments, processor(s) 125 and memory module(s) 124 can be used to execute, implement, and/or manage the operation of some aspects of the disclosed subject matter. In some embodiments, each of storage components 132-134 can include any storage medium or storage unit that is configured to store information accessible by processor(s) 125 via a system bus. In some embodiments, repository 106 or portions thereof can utilize storage components 132-134 and/or memory module(s) 124. For example, repository 106 may be implemented using storage component 132. In some embodiments, repository 106 and/or storage components 132-134 can include or utilize one or more storage area networks.

As indicated above, the subject matter disclosed herein can be implemented in software in combination with hardware and/or firmware. For example, subject matter described herein can be implemented in software executed by a processor. In some exemplary implementations, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, data collection engine 104 or repository 106 (e.g., a system library or data therein) can be located at a single computing system or can be distributed across one or more devices, platforms, and/or systems. As used in the disclosed subject matter, the terms "function" or "module" refer to hardware, firmware, or software in combination with hardware and/or firmware for implementing features described herein.

In some embodiments, various entities depicted in FIG. 1 can be incorporated or implemented using one or more other entities depicted in FIG. 1. For example, memory module(s) 124 and/or processor(s) 125 can be incorporated in compute component 126, compute component 127, compute component 128, and/or a specialized device or compute component (e.g., an application management pod (AMP)). In another example, CIS manager 102 can be implemented using or located in an AMP and/or another device in physical infrastructure 118. In yet another example, virtualization software and/or virtualized components can be implemented using an AMP and/or another compute device (e.g., a blade appliance designated for some system management software).

It will be appreciated that FIG. 1 is for illustrative purposes and that various components, their locations, and/or their functions as described above in relation to FIG. 1 can be changed, altered, added, or removed. For example, data collection engine 104 can comprise multiple, distributed components. Further, aspects of the disclosed subject matter (e.g., data collection engine 104) can be implemented and/or located on any computing system or components therein.

FIG. 2 is a diagram illustrating various metadata 200 according to an embodiment of the subject matter described herein. Metadata 200 may represent information associated with data collection, including data identifiers (e.g., a field name in a data store, data store identifiers (e.g., an address or identify of a data store), data attributes (e.g., whether data is mandatory or optional, data types, etc.), collection related time intervals (e.g., information for indicating how often to obtain data), collection related correlation information (e.g., information for indicating how to correlate, analyze, and/or use related collected data), data collection destinations (e.g., information indicating where to store and/or send collected data), and/or protocols usable for data collection.

In some embodiments, metadata 200 can be accessible to data collection engine 104 and/or other entities, e.g., CIS 100 or CIS manager 102. For example, metadata 200 may be used for configuring one or more data collectors to obtain configuration information and/or performance metrics about CSCs at regular intervals. In this example, metadata 200 may also be used for indicating where and/or how to store or send collected data for further processing, e.g., to repository 106 and/or to a data management application executing on client 160.

In some embodiments, metadata 200 can be obtained, deleted, modified, and/or provided via one or more communications interfaces. For example, metadata 200 may be generated and sent from client 160 to data collection engine 104 via an HTTP message using a REST API. In this example, after being received from client 160, metadata 200 may be stored in repository 106 using one or more data structures.

Referring to FIG. 2, metadata 200 can comprise associations between protocols, namespaces, element types, field names, and/or mandatory values. For example, a table representing metadata 200 can comprise columns and/or fields for a protocol, a namespace, an element type, a field name, and a mandatory value. A protocol field can comprise a protocol name and/or a related identifier indicating a protocol usable for obtaining data, such as "SNI", "SNMP", "VM REST API", "VM API", and/or other protocols.

A namespace field can comprise a data descriptor or data set identifier for indicating types of data, such as "CONFIG", "METRIC", or other types. For example, a CSC in CIS 100 may have different types or sets of information, such as configuration information (e.g., a resource type) and metric information (e.g., a performance indicator). In this example, each data set or type may be referred to as a namespace.

In some embodiments, metadata 200 may include information for scheduling a data collector to collect different namespaces at different intervals or different times. For example, a data collector may be configured by metadata 200 to collect configuration (e.g., "CONFIG") data (e.g., a VM related IP address) every 8 hours. In another example, a data collector may be configured by metadata 200 to collect metric (e.g., "METRIC") data (e.g., a KPI) every 5 minutes.

An element type field can comprise element type identifiers for indicating an CSC (e.g., component) type and/or a related data store containing relevant information to be collected, such as "ARRAY", "DISK", "PORT", "CPU", "VM", and/or other types. In some embodiments, an element type may be provided to a data collector and/or used for data collection purposes. For example, an element type may indicate to a data collector a particular device for obtaining data and/or a data store associated with the particular device for obtaining relevant data.

A field name field can comprise field name identifiers for indicating a field name associated with a data store containing relevant information to be collected, such as "ELEMENTNAME", "DISKTYPE", "CATEGORY", "CPUUTILPERCENTAGE", "DISKPERFORMANCE", "GUEST.IPADDRESS", "VMPROCESSINGPERCENTAGE", and/or other types. In some embodiments, a field name may be provided to a data collector and/or used for data collection purposes. For example, a field name may indicate to a data collector a particular field to inspect in a particular data store associated with a CSC.

In some embodiments, metadata 200 may include one or more source element types and source field names. For example, a source element type and a source field name may be usable for accessing data associated with a CSC, e.g., via the CSC's API. In this example, the source element type and the source field name may be passed as is from client 160 to data collection engine 104, via metadata 200.

In some embodiments, metadata 200 may include one or more destination element types and destination field names. For example, a destination element type and a destination field name may be usable for storing data associated with a CSC, e.g., in a data store or data structure local to data collection engine 104, such as repository 106. In this example, the destination element type may indicate a particular data store of repository 106 and the source field name may indicate a particular identifier or key for storing collected data in the data store of repository 106.

A mandatory value field can comprise Boolean values (e.g., "TRUE" or "FALSE") or other information for indicating whether a given attribute, value, or other data is mandatory. For example, if data is mandatory and the data cannot be collected, an error may be indicated or logged and/or other actions may be performed, such as notifying an operator or management system.

In some embodiments, metadata 200 may include description information usable for describing an attribute, value or data to be collected. In some embodiments, description information may be human readable and may be usable for logs and/or for reporting purposes.

It will be appreciated that metadata 200 is illustrative and that additional and/or different information can be used in performing metadata-driven data collection. For example, metadata 200 may also include identifiers for storing system related data in a local database, where the identifiers (e.g., field name and/or element type) are different than the identifiers used for obtaining the system related data. In another example, metadata 200 may include scheduling information for indicating when and/or how often data collection occurs for different CSCs or namespaces. In yet another example, metadata 200 may include information for correlating related collected data, e.g., for generating user specific reports.

Figure 3:
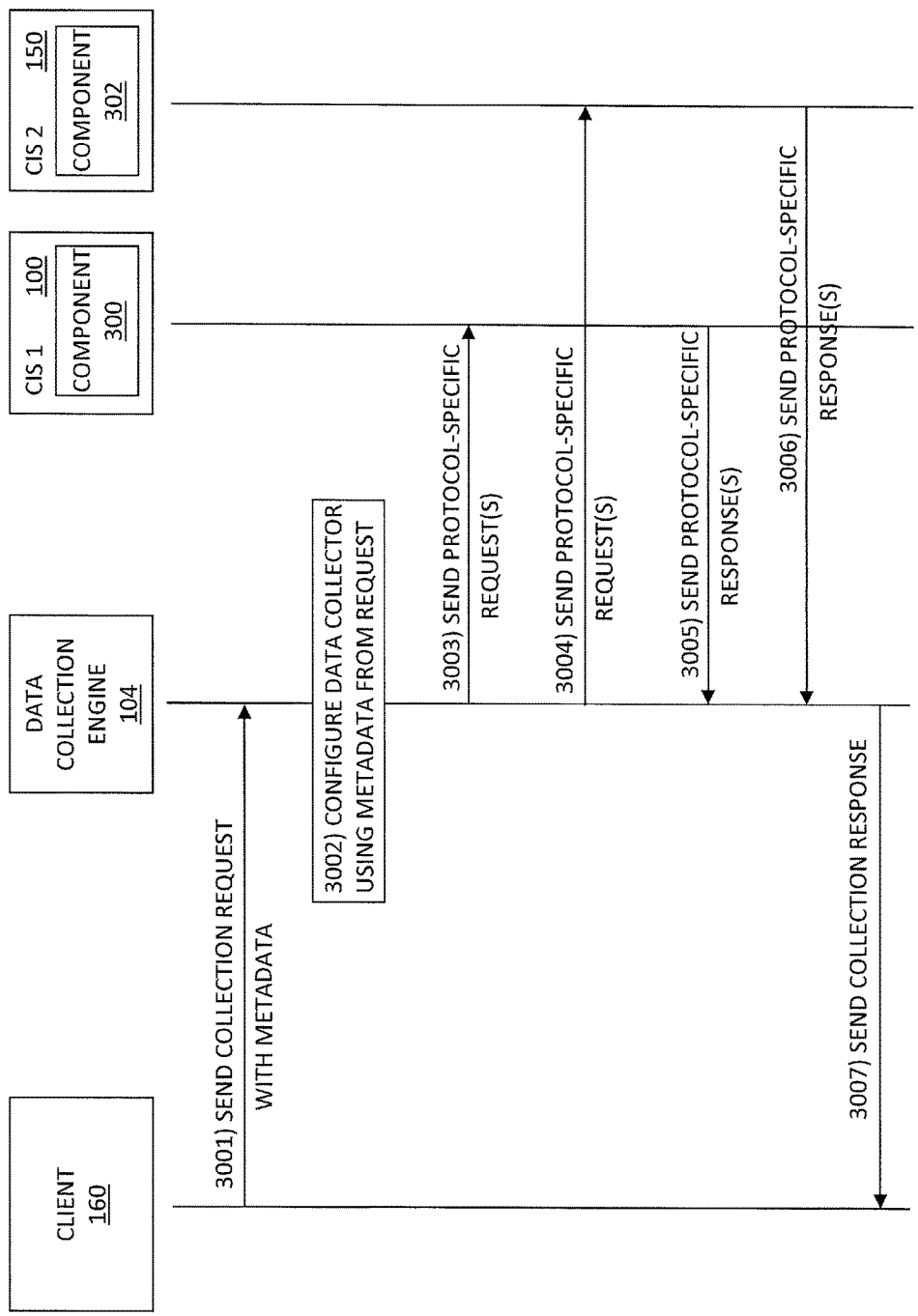
FIG. 3 is a diagram illustrating various communications associated with performing metadata-driven data collection according to an embodiment of the subject matter described herein.

FIG. 3 is a diagram illustrating various communications associated with performing metadata-driven data collection according to an embodiment of the subject matter described herein. In some embodiments, data collection engine 104 can be integrated with and/or can be located at CIS manager 102, e.g., server-side software executing on a processor at CIS 100. In some embodiments, data collection engine 104 can be integrated with and/or can be located at client 160, e.g., client-side software executing on a processor at client 160.

Referring to FIG. 3, data collection may be initiated for obtaining information about components 300 and 302. Component 300 may represent one or more CSCs located in or associated with CIS 100. For example, component 300 may include a computing platform, a computing device, a VM, a hypervisor, a compute component, a network component, a storage component, software, an operating system, firmware, hardware, a physical resource, and/or a virtual resource. Component 302 may represent one or more CSCs located in or associated with CIS 150.

At step 3001, a data collection request including metadata can be sent from client 160 to data collection engine 104. For example, a data management application at client 160 can generate a data collection request for obtaining information about a number of components in CIS 100. In this example, the data collection request may include metadata 200 that indicates a particular protocol and identifying information (e.g., an identifier that identifies the requested information at a source data store) for obtaining this information.

At step 3002, a data collector may be configured using the metadata from the data collection request. In some embodiments, data collector configuration may be initiated, triggered, or performed by data collection engine 104. For example, using metadata 200 from client 160, a VM data collector may be configured to gather or obtain information about one or more VMs as indicated by metadata 200. In this example, the VM data collector may include functionality for using one or more protocols for obtaining the indicated information.

At step 3003, one or more protocol specific requests may be sent from data collection engine 104 to component 300. For example, a VM data collector may send a SNMP related request to component 300 for obtaining information about an aspect of component 300.

At step 3004, one or more protocol specific requests may be sent from data collection engine 104 to component 302. For example, a VM data collector may send a storage management initiative (SMI) related request to component 302 for obtaining information about an aspect of component 302.

At step 3005, one or more protocol specific responses may be sent from component 300 to data collection engine 104. For example, after authenticating or verifying a SNMP related request from data collection engine 104 (e.g., using credentials provided by data collection engine 104 for interacting with CIS 100 and/or components therein), component 300 may send a SNMP response to data collection engine 104 containing information requested in the SNMP related request.

At step 3006, one or more protocol specific responses may be sent from component 302 to data collection engine 104. For example, after authenticating or verifying a SMI related request from data collection engine 104 (e.g., using credentials provided by data collection engine 104 for interacting with CIS 150 and/or components therein), component 302 may send a SMI response to data collection engine 104 containing information requested in the SMI related request.

In some embodiments (e.g., after receiving data from components 300 and 302 but prior to sending the data elsewhere), data collection engine 104 may correlate the data from components 300 and 302 into a report or other user-defined format. In this example, the format used may be defined or indicated by received metadata and the information may be correlated using unique identifiers associated with components 300 and 302.

At step 3007, a data collection response can be sent from data collection engine 104 to client 160. For example, a data collection response can be provided in a SNMP related response, an SMI related response, an HTTP message, or other message and/or can be provided in a format indicated by client 160, e.g., via metadata 200.

It will be appreciated that FIG. 3 is for illustrative purposes and that additional and/or different steps than those depicted in FIG. 3 can be usable for performing metadata-driven data collection. Additionally, it will be appreciated that steps depicted in FIG. 3 can occur in a different order than depicted or can be combined.

Figure 4:
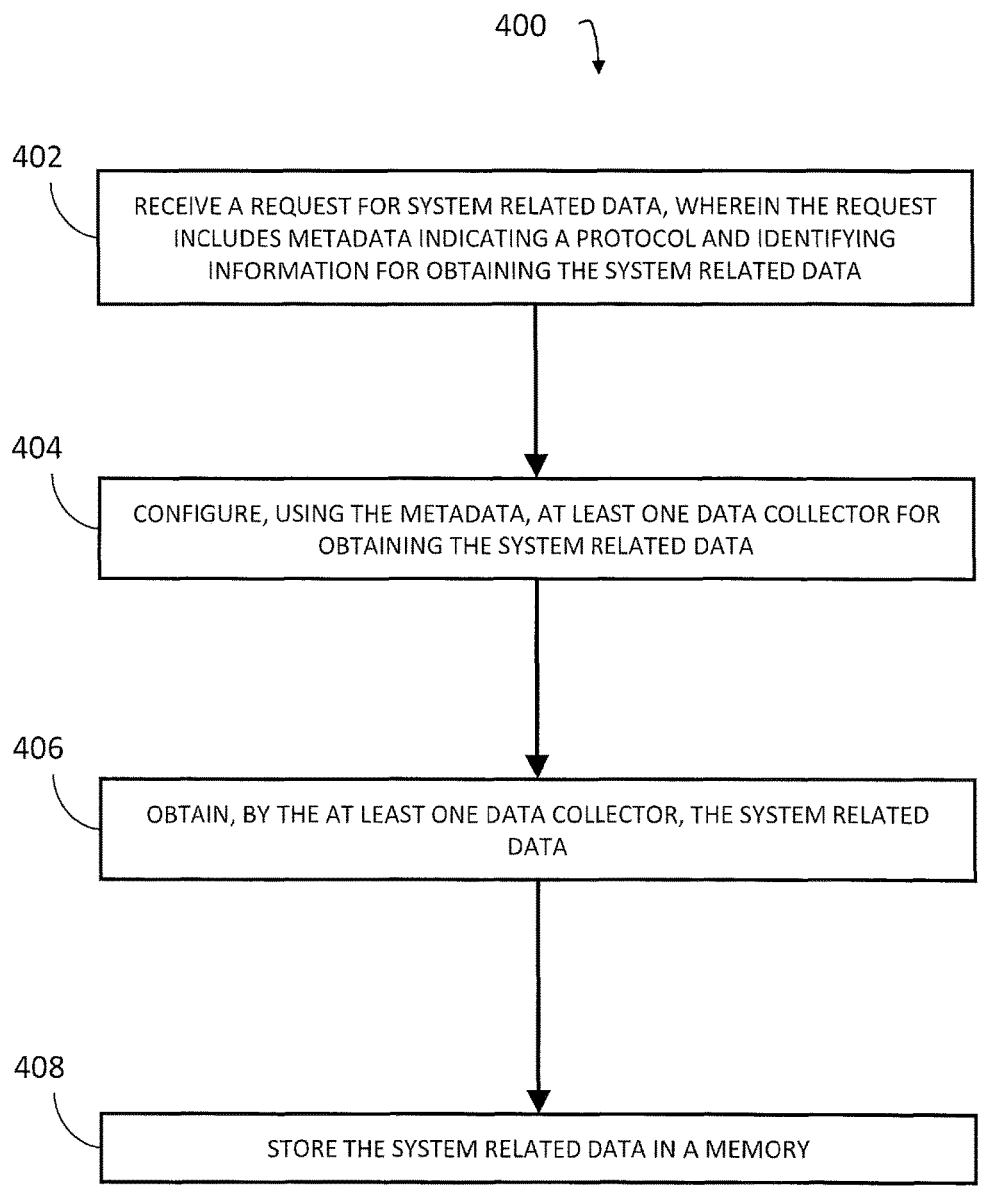
FIG. 4 is a diagram illustrating a method for performing metadata-driven data collection according to an embodiment of the subject matter described herein.

FIG. 4 is a diagram illustrating a method 400 for performing metadata-driven data collection according to an embodiment of the subject matter described herein. In some embodiments, method 400 and/or steps therein (e.g., steps 402, 404, 406, and/or 408) can be performed by CIS 100, data collection engine 104, and/or another node (e.g., a computing platform containing one or more processors and memory) or module. For illustrative purposes and explanation, references to entities included in FIGS. 1-3 can be used below.

In step 402, a request can be received for system related data. In some embodiments, the request may include metadata indicating a protocol and identifying information for obtaining the system related data.

In step 404, at least one data collector can be configured, using the metadata, for obtaining the system related data. For example, a SNMP data collector associated with a storage device may be configured such that the SNMP is able to obtain configuration information, such as a model number and/or storage capacity, from a data store (e.g., a database or a data structures) associated with the storage device.

In step 406, the system related data can be obtained by the at least one data collector. For example, a SNMP data collector may send an SNMP related request for information to a data store associated with a storage device and, in response, may receive an SNMP response message containing requested information from the storage device.

In step 408, the system related data can be stored in a memory. For example, after obtaining system related data from component 300, the system related data may be stored in repository 106.

In some embodiments, metadata can include a protocol identifier, a namespace identifier, an element type identifier, a field name identifier, a parameter identifier, and/or a mandatory value flag.

In some embodiments, a request for system related data can be received via a converged infrastructure system, a user interface, a GUI, a CLI, an API, and a REST API. For example, client 160 may send, using a REST API, a POST message containing metadata 200 for obtaining system related data to data collection engine 104.

In some embodiments, a data collector (e.g., software executing on a processor) can include a system(s) specific data collector, a component(s) specific data collector, and/or a protocol(s) specific data collector.

In some embodiments, obtaining system related data (e.g., by at least one data collector) can include using at least one member selected from a group consisting of a protocol, a SNMP, an SMI protocol, an API, a VMWare VSphere API, a REST API, a VNX REST API, and a VNXe REST API.

In some embodiments, metadata (e.g., from client 160) can be used to correlate system related data collected using different data collectors. For example, a SNMP data collector and a SNI data collector can be used to gather information about storage component 132. In this example, metadata 200 can indicate how to merge, correlate, and/or convert (e.g., reformat) the collected information.

In some embodiments, metadata (e.g., from client 160) can be used to schedule data collection by at least one data collector. For example, metadata 200 can include scheduling information indicating how often a data collector is to collect data.

In some embodiments, system related data (e.g., information about CIS 100) can include information about at least one member selected from a group consisting of a computing platform, a computing device, a VM, a hypervisor, a compute component, a network component, a storage component, software, an operating system, firmware, hardware, a physical resource, and/or a virtual resource.

It should be noted that data collection engine 104 and/or functionality described herein can constitute a special purpose computing system. Further, data collection engine 104 and/or functionality described herein can improve the technological field of data collection by allowing metadata (e.g., provided by various entities and/or at various times) to be used for configuring one or more data collectors for obtaining information about one or more computing systems, CISs, and/or CSCs therein.

Data collection engine 104 and/or functionality described herein can improve the functionality of data collection by using configurable (e.g., metadata-driven) data collectors, thereby allowing data collection to be flexible and dynamic, e.g., without requiring software updates for data collectors when new and/or different information is requested. It should also be noted that a computing platform that implements the subject matter described herein can comprise a special purpose computing device usable to perform a free-form query for obtaining information about one or more computing systems, CISs, and/or CSCs therein.

It will be understood that various details of the subject matter described herein can be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing metadata-driven data collection, the method comprising:
   receiving a request for system related data, wherein the request includes metadata indicating identifying information for obtaining the system related data, wherein the identifying information includes a data store identifier;
   selecting, using the metadata, at least one data collector from among a plurality of different types of data collectors for gathering information about a system virtual machine (VM);
   configuring, using the metadata, the at least one data collector for obtaining the system related data, wherein the at least one data collector is implemented using software executing on at least one processor, where configuring the at least one data collector includes using the metadata to initiate the at least one data collector;
   obtaining, by the at least one data collector, the system related data, wherein the at least one data collector accesses, using a simple network management protocol (SNMP) or a storage management initiative (SMI) protocol, a data store identified in the metadata; and
   storing the system related data in a memory.

2. The method of claim 1 wherein the metadata includes at least one member selected from a group consisting of a protocol identifier, a namespace identifier, an element type identifier, a field name identifier, a parameter identifier, or a mandatory value flag.

3. The method of claim 1 wherein the request for system related data is received via at least one member selected from a group consisting of a user interface, a graphical user interface (GUI), a command-line interface (CLI), an application programming interface (API), and a representation state transfer (REST) API.

4. The method of claim 1 wherein the at least one data collector includes at least one member selected from a group consisting of a system(s) specific data collector, a component(s) specific data collector, and a protocol(s) specific data collector.

5. The method of claim 1 wherein obtaining, by the at least one data collector, the system related data includes using at least one member selected from a group consisting of an application programming interface (API), a VMWare VSphere API, a REST API, a VNX REST API, and a VNXe REST API.

6. The method of claim 1 comprising:
   at least one action selected from a group consisting of:
      using the metadata to correlate the system related data collected using different data collectors; and
      using the metadata to schedule data collection by the at least one data collector.

7. The method of claim 1 wherein the system related data includes information about at least one member selected from a group consisting of a computing platform, a computing device, a converged infrastructure system, a virtual machine, a hypervisor, a compute component, a network component, a storage component, software, an operating system, firmware, hardware, a physical resource, and a virtual resource.

8. A system for performing metadata-driven data collection, the system comprising:
   a processor; and
   a data collection engine implemented using the processor, wherein the data collection engine is configured to receive a request for system related data, wherein the request includes metadata indicating identifying information for obtaining the system related data, wherein the identifying information includes a data store identifier, to select, using the metadata, at least one data collector from among a plurality of different types of data collectors for gathering information about a system virtual machine (VM), to configure, using the metadata, the at least one data collector for obtaining the system related data, wherein the at least one data collector is implemented using software executing on at least one processor, where configuring the at least one data collector includes using the metadata to initiate the data collector, to obtain, by the at least one data collector, the system related data, wherein the at least one data collector accesses, using a simple network management protocol (SNMP) or a storage management initiative (SMI) protocol, a data store identified in the metadata, and to store the system related data in a memory.

9. The system of claim 8 wherein the metadata includes at least one member selected from a group consisting of a protocol identifier, a namespace identifier, an element type identifier, a field name identifier, a parameter identifier, or a mandatory value flag.

10. The system of claim 8 wherein the request for system related data is received via at least one member selected from a group consisting of a user interface, a graphical user interface (GUI), a command-line interface (CLI), an application programming interface (API), and a representation state transfer (REST) API.

11. The system of claim 8 wherein the at least one data collector includes at least one member selected from a group consisting of a system(s) specific data collector, a component(s) specific data collector, and a protocol(s) specific data collector.

12. The system of claim 8 wherein the at least one data collector is configured to obtain the system related data using at least one member selected from a group consisting of an application programming interface (API), a VMWare VSphere API, a REST API, a VNX REST API, and a VNXe REST API.

13. The system of claim 8 wherein the data collection engine is configured to perform at least one action selected from a group consisting of:
   use the metadata to correlate the system related data collected using different data collectors; and
   use the metadata to schedule data collection by the at least one data collector.

14. The system of claim 8 wherein the system related data includes information about at least one member selected from a group consisting of a computing platform, a computing device, a converged infrastructure system, a virtual machine, a hypervisor, a compute component, a network component, a storage component, software, an operating system, firmware, hardware, a physical resource, and a virtual resource.

15. A non-transitory computer readable medium having stored thereon executable instructions which, when executed by a processor of a computer, cause the computer to perform steps comprising:
receiving a request for system related data, wherein the request includes metadata indicating identifying information for obtaining the system related data, wherein the identifying information includes a data store identifier;
selecting, using the metadata, at least one data collector from among a plurality of different types of data collectors for gathering information about a system virtual machine (VM);
configuring, using the metadata, the at least one data collector for obtaining the system related data, wherein the at least one data collector is implemented using software executing on at least one processor, where configuring the at least one data collector includes using the metadata to initiate the at least one data collector;
obtaining, by the at least one data collector, the system related data, wherein the at least one data collector accesses, using a simple network management protocol (SNMP) or a storage management initiative (SMI) protocol, a data store identified in the metadata; and
storing the system related data in a memory.

16. The non-transitory computer readable medium of claim 15 wherein the metadata includes at least one member selected from a group consisting of a protocol identifier, a namespace identifier, an element type identifier, a field name identifier, a parameter identifier, or a mandatory value flag.

17. The non-transitory computer readable medium of claim 15 wherein the request for system related data is received via at least one member selected from a group consisting of a user interface, a graphical user interface (GUI), a command-line interface (CLI), an application programming interface (API), and a representation state transfer (REST) API.

18. The non-transitory computer readable medium of claim 15 wherein the at least one data collector includes at least one member selected from a group consisting of a system(s) specific data collector, a component(s) specific data collector and a protocol(s) specific data collector.

19. The non-transitory computer readable medium of claim 15 wherein obtaining, by the at least one data collector, the system related data includes using at least one member selected from a group consisting of, an application programming interface (API), a VMWare VSphere API, a REST API, a VNX REST API, and a VNXe REST API.

20. The non-transitory computer readable medium of claim 15 comprising:
at least one action selected from a group consisting of:
using the metadata to correlate the system related data collected using different data collectors; and
using the metadata to schedule data collection by the at least one data collector.

* * * * *